(12) United States Patent
Mei et al.

(10) Patent No.: US 11,241,641 B2
(45) Date of Patent: Feb. 8, 2022

(54) FILTER DEVICE WITH SPIRALLY FLUSHING FUNCTION

(71) Applicant: Kunshan EcoWater Systems Co., Ltd., Kunshan (CN)

(72) Inventors: Miaoqiang Mei, Kunshan (CN); Fei Xue, Kunshan (CN); Chunxia Xu, Kunshan (CN); Rui Feng, Kunshan (CN); Min Feng, Kunshan (CN)

(73) Assignee: Kunshan Ecowater Systems Co., Ltd., Kunshan (CN)

( * ) Notice: Subject to any disclaimer, the term of this patent is extended or adjusted under 35 U.S.C. 154(b) by 122 days.

(21) Appl. No.: 16/716,355

(22) Filed: Dec. 16, 2019

(65) Prior Publication Data

US 2021/0060458 A1 Mar. 4, 2021

(30) Foreign Application Priority Data

Aug. 26, 2019 (CN) .......................... 201910792126.X
Aug. 26, 2019 (CN) .......................... 201921394425.X

(51) Int. Cl.
*B01D 29/15* (2006.01)
*B01D 35/30* (2006.01)
*B01D 29/90* (2006.01)
*B01D 29/94* (2006.01)

(52) U.S. Cl.
CPC ............. *B01D 29/15* (2013.01); *B01D 29/90* (2013.01); *B01D 29/945* (2013.01); *B01D 35/30* (2013.01); *B01D 2201/291* (2013.01); *B01D 2201/304* (2013.01)

(58) Field of Classification Search
CPC ...... B01D 29/15; B01D 35/30; B01D 29/945; B01D 29/90; B01D 2201/304; B01D 2201/291; B01D 29/906; B01D 29/21; B01D 36/006; B01D 2201/301; B01D 2201/307; B01D 35/22; B01D 2201/30; B01D 2201/31; B01D 2201/313; B01D 61/18; B01D 63/00; B01D 63/10; B01D 63/06; B01D 69/04
USPC ........ 210/433.1, 440–444, 455, 456, 497.01, 210/483–485, 321.6, 321.76, 321.78, 210/321.85, 321.87

See application file for complete search history.

(56) References Cited

U.S. PATENT DOCUMENTS 3,272,336 A * 9/1966 Humbert, Jr. ........ B01D 29/902
210/132

* cited by examiner

*Primary Examiner* — Madeline Gonzalez
(74) *Attorney, Agent, or Firm* — Booth Udall Fuller, PLC

(57) ABSTRACT

A filter device with a spirally flushing function with a head having a filter flask main body and a water inlet hole connected with a water inlet passage, a water outlet hole connected with a water outlet passage, and a flushing hole connected with a flushing passage. A filter element casing arranged outside the filter element, and has a plurality of filter element casing water inlets. A flow divider arranged outside the filter element casing and covering a portion of an upper end of the filter element casing. A filter element end cap fixed to the top of the filter element and having a water outlet, which penetrates through the flow divider and is connected with the water outlet passage. Effectively improved flushing effect, and greatly prolonged service life of the filter element is experienced.

16 Claims, 9 Drawing Sheets

FILTER DEVICE WITH SPIRALLY FLUSHING FUNCTION

CROSS REFERENCE TO RELATED APPLICATIONS

This application claims the benefit of Chinese Patent Application No. 201910792126.X, filed Aug. 26, 2019, and Chinese Patent Application No. 201921394425.X, filed Aug. 26, 2019, the contents of each of which are incorporated herein by reference in their entireties.

FIELD OF THE TECHNOLOGY

The present disclosure relates to a water treatment purification technology, and in particular to a filter device with a spirally flushing function.

DESCRIPTION OF THE RELATED ART

With the emphasis on drinking water health and the development of ultrafiltration technology, an ultrafiltration membrane has been selected as a filter main body in more and more filter devices. However, a traditional ultrafiltration device does not have a flushing function, or although the traditional ultrafiltration device has a flushing function, its uneven flushing results in dead angles that cannot be flushed, so the flushing effect is not achieved. This can shorten the service life of a filter element and requires frequent replacement of the filter element, resulting in an increased cost of use.

SUMMARY

An aspect of the present disclosure is to provide a filter device with a spirally flushing function, to resolve the problem of a short service life of a filter element due to a unsatisfactory flushing effect of a filter device in the prior art.

The present disclosure proposes a filter device with a spirally flushing function, including a head, a filter flask main body, a filter element, a filter element casing, a flow divider and a filter element end cap, wherein the head includes a water inlet hole, a water outlet hole, and a flushing hole, the water inlet hole being connected with a water inlet passage, the water outlet hole being connected with a water outlet passage, and the flushing hole being connected with a flushing passage; the filter flask main body is connected with the head, and the filter element, the filter element casing, the flow divider and the filter element end cap are arranged inside the filter flask main body; the filter element casing is arranged outside the filter element, and the filter element casing has a plurality of filter element casing water inlets, wherein a first gap is formed between the filter element casing and the filter flask main body, and the first gap forms a part of the flushing passage; the flow divider is arranged outside the filter element casing and covers a portion of the upper end of the filter element casing, wherein a second gap is formed between the flow divider and the filter flask main body, and the second gap forms another part of the flushing passage; the filter element end cap is fixed to the top of the filter element, and the filter element end cap has a water outlet, which penetrates through the flow divider and is connected with the water outlet passage, wherein a third gap is formed between the filter element end cap and the flow divider, and the third gap forms a part of the water inlet passage; wherein raw water enters the water inlet passage from the water inlet hole, and the raw water enters the filter element casing through the plurality of filter element casing water inlets in a spiral manner, and then the raw water flows in a rotating manner on the surface of the filter element to be filtered by the filter element into filtered water and concentrated water; the filtered water enters the water outlet passage from the water outlet of the filter element end cap and flows out from the water outlet hole; and the concentrated water enters the flushing passage from the lower end of the filter element, and spirally flows out from the flushing hole.

The filter flask main body includes a filter flask and a filter flask bottom cap; one end of the filter flask is connected with the head, and the other end thereof is connected with the filter flask bottom cap; the filter flask includes a flask opening portion and a flask body portion; the flask opening portion of the filter flask is provided with a filter flask thread, and a side wall of the flushing passage of the head is provided with a head thread corresponding to the filter flask thread; the head is connected with the filter flask by connecting the filter flask thread with the head thread.

Wherein, a spiral water guiding surface is provided at the connection between the flushing passage and the flushing hole, and the concentrated water enters the flushing passage from the lower end of the filter element, and flows out from the flushing hole through the spiral water guiding surface.

Wherein, an upper portion of the outer surface of the filter element casing has a plurality of spirally rotating water inlet guide ribs, and a plurality of filter element casing water inlets are provided at the water inlet guide ribs of the filer element casing; the inner surface of the filter element casing has a plurality of flushing guide ribs, the rotating direction of which is same as that of the water inlet guide ribs, and which are connected with the water inlet guide ribs; and a lower portion of the outer surface of the filter element casing has a plurality of spirally rotating flow guide ribs, the rotating direction of which is opposite to that of the water inlet guide ribs.

Wherein, a filter element casing seal groove is further provided between the flow guide ribs and the water inlet guide ribs; a filter element casing seal gasket is arranged in the filter element casing seal groove; and the filter element casing seal gasket is configured to seal a gap between the filter element casing and the flow divider.

Wherein, the outer surface of the flow divider is provided with a plurality of spirally rotating diversion ribs, and the diversion ribs are matched with the flow guide ribs.

Wherein, the flow divider is provided with a seal groove, in which a flow divider seal gasket is provided, and the flow divider seal gasket is configured to seal a gap between the flow divider and a side wall of the water inlet.

Wherein, the filter element end cap is provided with a protruding portion, and the water outlet is provided at a middle position of the protruding portion of the filter element end cap.

What's more, the present disclosure proposes another preferred filter device with a spirally flushing function. It comprises a head, a filter flask main body, a filter element, a filter element casing, a flow divider and a filter element end cap, wherein the head comprises a water inlet hole, a water outlet hole and a flushing hole. The filter flask is connected with the head, and the filter element, the filter element casing, the flow divider and the filter element end cap are arranged inside the filter flask main body. The filter element casing is arranged outside the filter element, and the filter element casing has a plurality of filter element casing water inlets, wherein a first gap, forming as a part of the flushing passage which is connected with the flushing hole, is configurated between the filter element casing and the filter flask main body. The flow divider is provided outside the filter element casing and covers a portion of an upper end of the filter element casing, wherein a second gap, forming as another part of the flushing passage, is configured between the flow divider and the filter flask main body. The filter element end cap is fixed to the top of the filter element, and the filter element end cap provides a water outlet, which penetrates through the flow divider and is connected with the water outlet passage, wherein a third gap, forming as a part of the water inlet passage, is configured between the filter element end cap and the flow divider. And what's more, a fourth gap, forming as another part of the water inlet passage, is configured between the filter element casing and the flow divider. Wherein raw water enters into the water inlet passage from the water inlet hole and swirls and flows in a rotating manner on the surface of the filter element through the water inlet passage so as to be filtered by the filter element into filtered water and concentrated water; the filtered water enters into the water outlet passage from the water outlet of the filter element end cap and flows out from the water outlet hole; and the concentrated water spirally enters into the flushing passage from the lower end of the filter element, and spirally flows out from the flushing hole.

In the filter device with the spirally flushing function according to the present disclosure, water flows and flushes in a spiral manner in a process from the raw water entering and passing through the surface of the filter element, to the concentrated water flushing out from the flushing hole, so that the filter element can be spirally flushed fully and evenly. By this way, the flushing effect is better, and the service life of the filter element is effectively prolonged.

BRIEF DESCRIPTION OF THE DRAWINGS

The present disclosure will be described below in conjunction with the accompanying drawings, in which same reference numerals represent same elements, wherein.

DETAILED DESCRIPTION

Figure 1A:
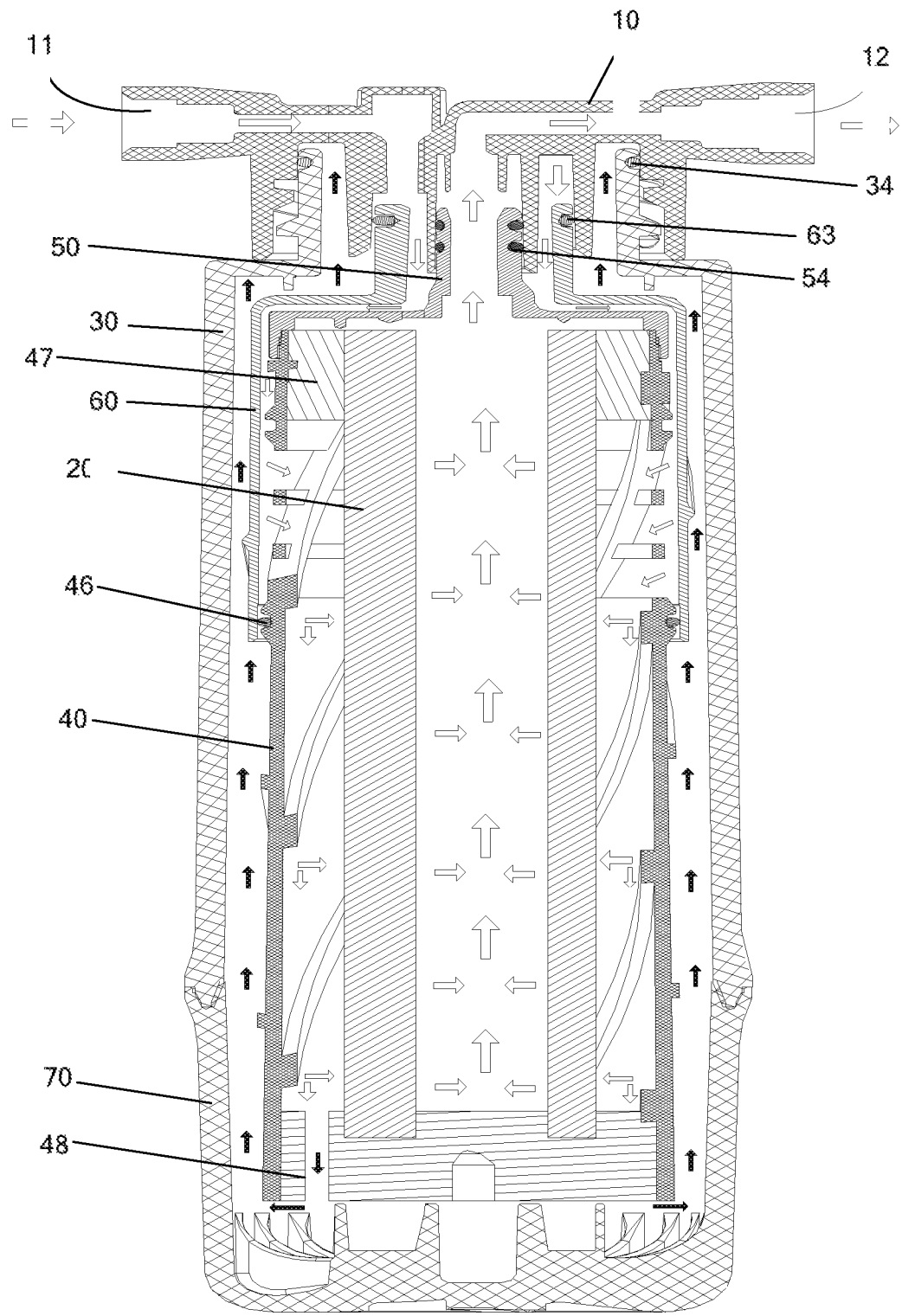
FIG. 1A is a sectional view of a filter device.

In combination with a reference to FIGS. 1A to 1C and FIG. 7, a filter device of the present disclosure at least includes: a head 10, a filter element 20, a filter flask 30, a filter element casing 40, a filter element end cap 50, a flow divider 60, and a filter flask bottom cap 70. Referring to FIGS. 2A to 2C, the head 10 is arranged at an uppermost position of the filter device, and the head 10 includes a water inlet hole 11, a water outlet hole 12, and a flushing hole 13. Raw water flows into the filter device through the water inlet hole 11, and the water inlet hole 11 is connected with a water inlet passage. Filtered water after filtration flows out through the water outlet hole 12, and the water outlet hole 12 is connected with a water outlet passage. Concentrated water after filtration passes through a flushing passage and flows out from the flushing hole 13. In an preferred embodiment according to the present application, a head thread 14 is provided on a side wall of the flushing passage of the head 10, and the head thread 14 is used for connection with the filter flask 30.

The filter element 20 is located within the filter flask 30, and the filter element 20 is used to filter raw water, and the filtered water after filtration enters into the water outlet passage from a passage in the middle of the filter element 20. The filter element 20 can perform the filtering treatment by using an ultrafiltration technology or other existing technologies in the art. It should be noted that, in the present disclosure, the water not filtered by the filter element 20 is defined as raw water (i.e., water to be filtered), and the raw water filtered by the filter element 20 is then divided into filtered water and concentrated water, wherein the water that has passed the surface of the filter element 20 and entered into the interior of the filter element 20 (subjected to filtering treatment) is defined as filtered water, and the water that has passed the surface of the filter element 20 but not entered into the interior of the filter element 20 is defined as concentrated water.

Figure 3A:
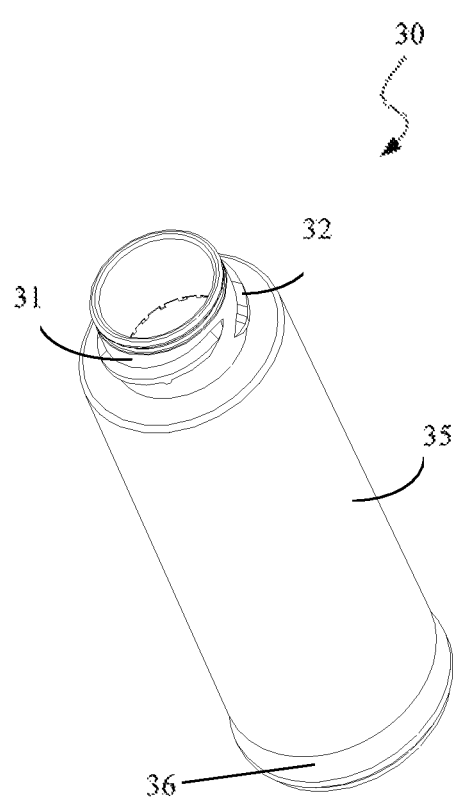
FIG. 3A is a stereoscopic view of a filter flask.
Figure 3B:
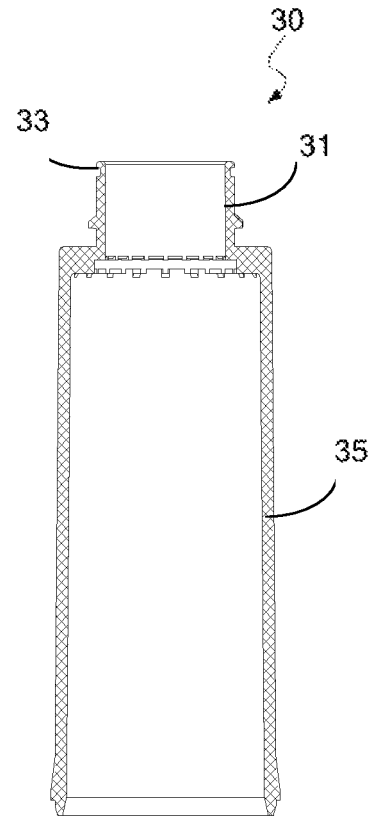
FIG. 3B is a cross-sectional view of the filter flask.
Figure 3C:
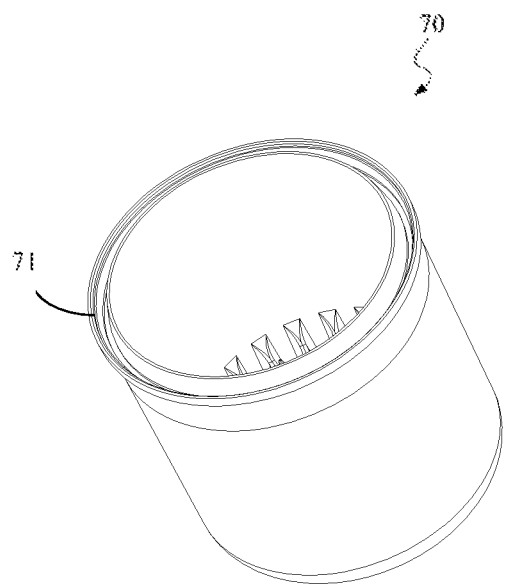
FIG. 3C is a stereoscopic view of a bottom cap of the filter flask.

Referring to FIGS. 3A to 3C and FIG. 7, an upper end of the filter flask 30 is connected with the head 10, and a lower end of the filter flask 30 is connected with the filter flask bottom cap 70. Referring to FIGS. 3A to 3C, the filter flask 30 includes a flask opening portion 31 and a flask body portion 35, wherein a filter flask thread 32 is provided on an outer surface of the flask opening portion 31, and the filter flask thread 32 is adapted to the head thread 14 of the head 10. By spirally connecting the filter flask thread 32 with the head thread 14, the filter flask 30 and the head 10 are fixedly connected. A seal groove 33 is further provided at a top end of the flask opening portion 31, and a seal gasket 34 of the filter flask (as shown in FIG. 1A) is arranged in the seal groove 33, and the seal gasket 34 of the filter flask is configured to seal the connections between the filter flask 30 and the head 10 to prevent water from being leaked. A welding boss 36 is provided at a tail end of the flask body portion 35, and as shown in FIG. 3C, a welding groove 71 is provided at an upper end of the filter flask bottom cap 70. By welding the welding boss 36 and the welding groove 71 together, the filter flask 30 and the filter flask bottom cap 70 are connected together to form a filter flask main body. The filter element 20, the filter element casing 40, the filter element end cap 50 and the flow divider 60 are all arranged inside the filter flask main body.

Figure 4A:
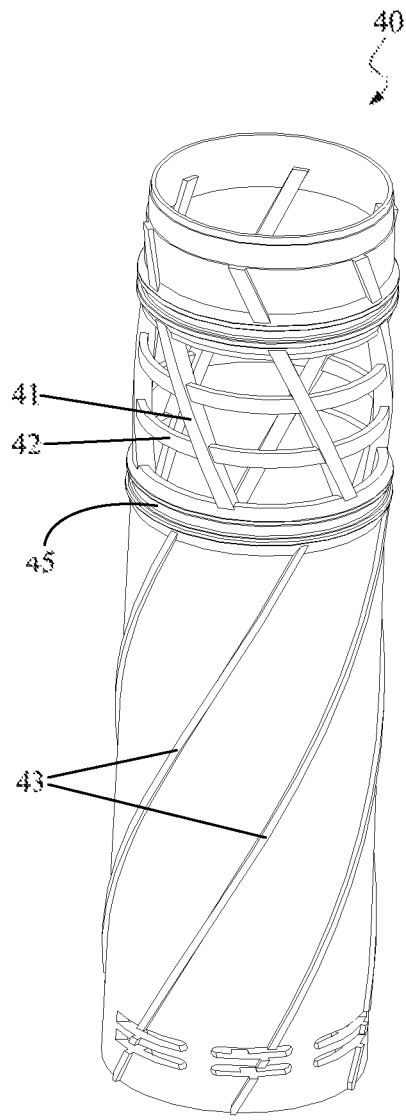
FIG. 4A is a stereoscopic view of the outer surface of a filter element casing.
Figure 4B:
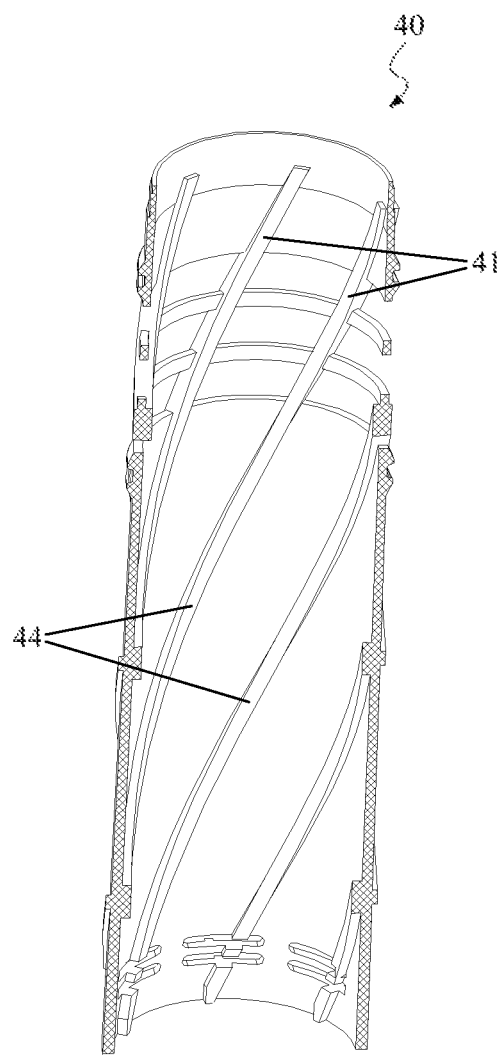
FIG. 4B is a stereoscopic view of the inner surface of the filter element casing.

Referring to FIGS. 4A and 4B, the filter element casing 40 is arranged outside the filter element 20, and the raw water from the water inlet passage is available to enter into the interior of the filter element casing 40 from an upper portion of the filter element casing 40. Specifically, the upper portion of the filter element casing 40 provides a plurality of water inlet guide ribs 41 with spiral rotation shape, and the upper portion of the filter element casing 40 also provides a plurality of laterally arranged support ribs 42. A plurality of filter element casing water inlets are positioned at the intersection points formed by the plurality of water inlet guide ribs 41 and the plurality of support ribs 42 which are arranged by crisscross pattern. In other words, the upper portion of the filter element casing 40 is hollowed out, and the water inlets are formed at hollowed portions. The raw water flowing from the water inlet passage can spirally flow into the interior of the filter element casing 40 through the filter element casing water inlets. The raw water, after flowing into the interior of the filter element casing 40, can contact the outer surface of the filter element 20 and then be filtered by the filter element 20. A lower portion of the outer surface of the filter element casing 40 provides a plurality of flow guide ribs 43 with spiral rotation shape, and the rotating direction of the flow guide ribs 43 is opposite to that of the water inlet guide ribs 41. Where the water inlet guide ribs 41 are rotated spirally counterclockwise, then the flow guide ribs 43 are rotated spirally clockwise. A seal groove 45 of the filter element casing is further provided between the flow guide ribs 43 and the water inlet guide ribs 41. A seal gasket 46 of the filter element casing (refer to FIG. 7) is arranged in the filter element casing seal groove 45, and the seal gasket 46 of the filter element casing is configured to seal a gap between the filter element casing 40 and the flow divider 60. When water flows along the water inlet passage to the filter element casing seal groove 45, due to the action of the seal gasket 46, the water is available to enter into the interior of the filter element casing 40 through the water inlets, but will not enter into the water outlet passage.

It should be noted that, gaps at two ends of both the filter element casing 40 and the filter element 20 can be sealed by a sealant. Referring to FIG. 1A, the upper ends of the filter element casing 40 and the filter element 20 are sealed by a sealant 47, and the lower ends of the filter element casing 40 and the filter element 20 are sealed by a sealant 48.

Further referring to FIG. 4B, the lower portion of the inner surface of the filter element casing 40 has a plurality of flushing guide ribs 44, and the rotating direction of the flushing guide ribs 44 is same as that of the water inlet guide ribs 41, and the flushing guide ribs 44 are connected with the water inlet guide ribs 41. After the raw water enters into the interior of the filter element casing 40 along the water inlet passage, the raw water forms a spirally rotating water flow to contact with the filter element 20 under the action of the flushing guide ribs 44. By this way, the raw water can also be filtered by the filter element 20 while flushing the filter element 20.

In the above embodiment, the filter element casing seal groove 45 can be considered to divide the filter element casing 40 into two portions including an upper portion and a lower portion, wherein the upper portion has the plurality of filter element casing water inlets. When viewed from the outer surface of the filter element casing 40, the upper portion of the filter element casing 40 provides a plurality of water inlet guide ribs 41 and a plurality of support ribs 42, and the lower portion of the filter element casing 40 provides a plurality of flow guide ribs 43; and when viewed from the inner surface of the filter element casing 40, the upper portion of the filter element casing 40 provides a plurality of water guiding ribs 41, and the lower portion of the filter element casing 40 provides a plurality of flushing guide ribs 44. As the upper portion of the filter element casing 40 has a hollowed-out structure, the water inlet guide ribs 41 run through the outer surface and the inner surface of the filter element casing 40. On the interior surface of the filter element casing 40, the water inlet guide ribs 41 and the flushing guide ribs 44 can contact or abut/cling against the outer surface of the filter element 20. Alternatively, a small distance is reserved between the water inlet guide ribs 41 as well as the flushing guide ribs 44 and the filter element 20.

Figure 5:
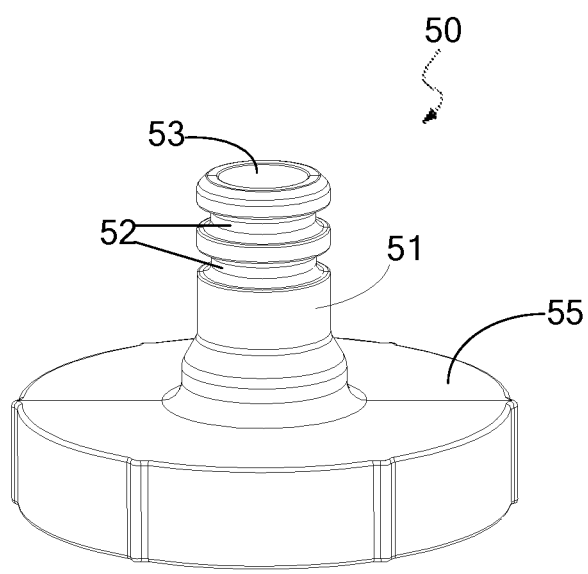
FIG. 5 is a stereoscopic view of a filter element end cap.

Referring to FIG. 5, the filter element end cap 50 is arranged on the top of the filter element casing 40 and the filter element 20; and the filter element end cap 50 includes a protruding portion 51 and a cap body 55, wherein the cap body 55 is sized and shaped to fit the top of the filter element casing 40, and the cap body 55 is arranged on the top of the filter element casing 40 and the filter element 20 and fixedly connected with the filter element casing 40 and the filter element 20, either by welding or by other connecting manners. Below the filter element end cap 50, the protruding portion 51 is aligned or substantially aligned with the water outlet of the filter element 20 in the filter element casing 40. What're more, above the filter element end cap 50, the protruding portion 51 projects into the head 10 and is directly connected with the water outlet passage. In some preferable embodiments, a majority of the water outlet passage can be located within the head 10 and besides, the protruding portion 51 can also be used to constitute a part of the water outlet passage.

In some embodiments of the present disclosure, the protruding portion 51 has one or more seal grooves 52. As an example, two seal grooves 52 are shown in FIG. 5, and other numbers of seal grooves may also be provided in other embodiments. A seal gasket 54 is provided in the seal groove 52, and the seal gasket 54 is configured to seal a gap between the protruding portion 51 and a side wall of the water outlet passage. Further, a water outlet 53 is provided at a middle position of the protruding portion 51, and the filtered water with filtering treatment by the filter element 20 enters into the water outlet passage through the water outlet 53 of the filter element end cap 50, and then flows out of from the water outlet hole 12.

Figure 6A:
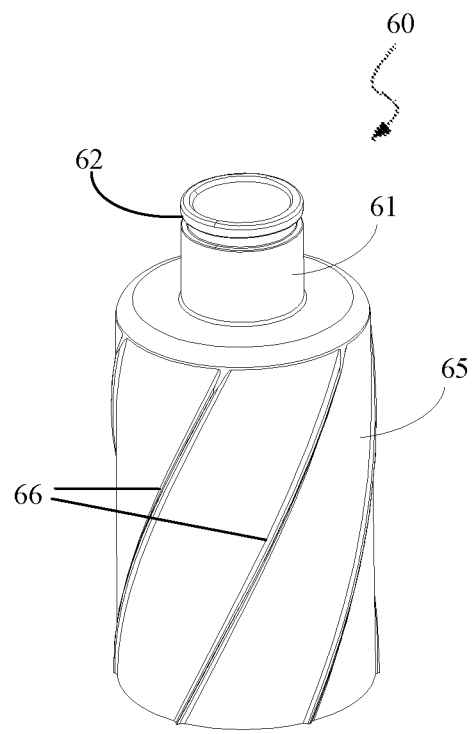
FIG. 6A is a stereoscopic view of a flow divider.
Figure 6B:
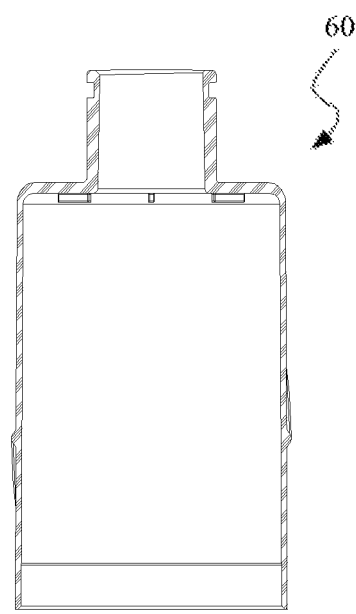
FIG. 6B is a sectional view of the flow divider.
Figure 7:
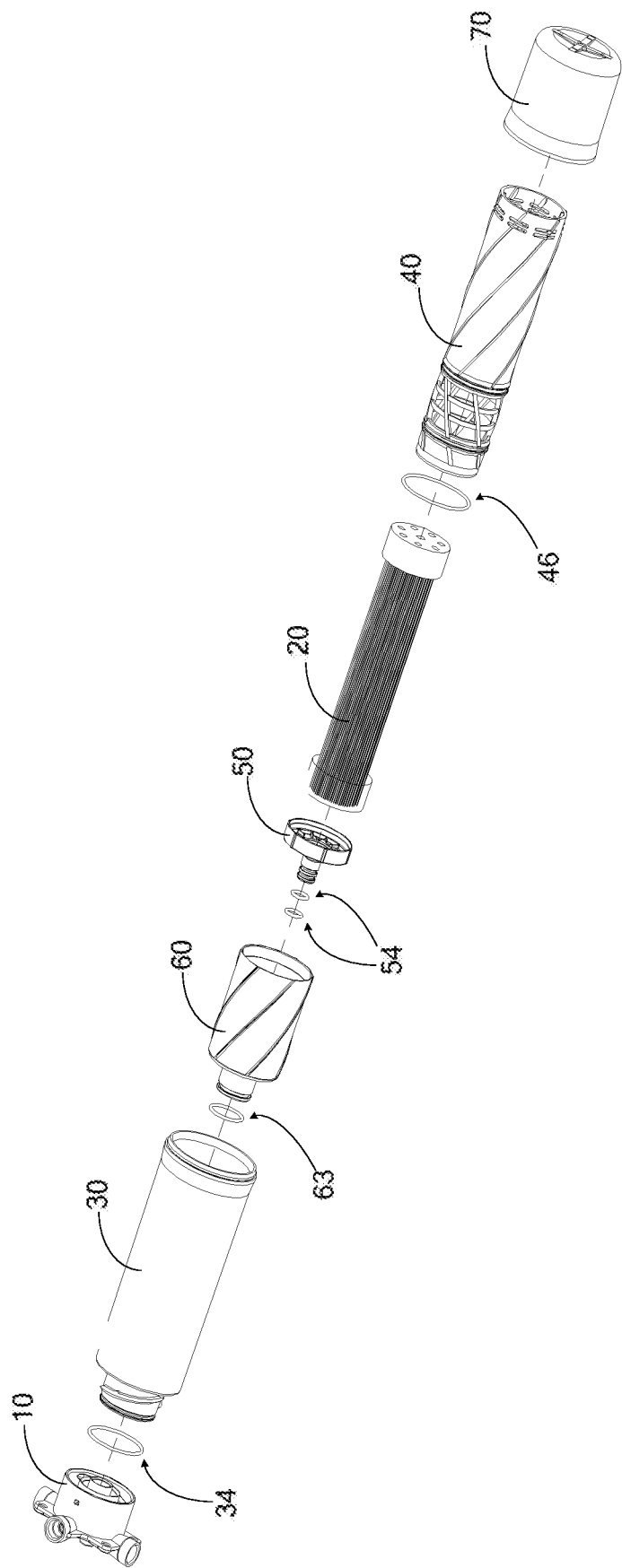
FIG. 7 is an exploded schematic view of the filter device.

Referring to FIGS. 6A and 6B, the flow divider 60 is arranged at the interior side of the filter flask 30 and also positioned at the outer side of the filter element end cap 50 and the filter element casing 40. The shape of the flow divider 60 is similar to that of the filter flask 30, but with smaller size than that of the filter flask 30. According to various embodiments, a gap (a third gap) between the flow divider 60 and the filter element end cap 50 forms a part of the water inlet passage; a gap (a fourth gap) between the flow divider 60 and the filter element casing 40 forms a part of the water inlet passage; and a gap (a second gap) between the flow divider 60 and the filter flask main body 30 forms a part of the flushing passage. Specifically, the flow divider 60 includes a flask opening portion 61 and a flask body portion 65. The flask opening portion 61 extends into the water inlet passage and is connected with a side wall of the water inlet passage, so that the raw water entering from the water inlet hole is available to flow along the inner surface of the flow divider 60. The flask opening portion 61 provides a seal groove 62, the seal groove 62 is internally provided with a flow divider seal gasket 63, and the flow divider seal gasket 63 is mainly configured to seal a gap between the flow divider 60 and the side wall of the water inlet passage. A plurality of diversion ribs 66 with spiral rotation shape are provided on the outer surface of the flask body portion 65. In some embodiments, the rotating angle and rotation direction of the diversion ribs 66 can be the same as those of the flow guide ribs 43. The diversion ribs 66 enable the concentrated water flowing through the outer surface of the flow divider 60 to flow out in swirling and rotating manner. As shown in the figures, the flow divider 60 covers the upper portion of the filter element casing 40; that is, the portion of filter element casing 40 above the filter element casing seal groove 45 is covered by the flow divider 60.

According to an embodiment of the present disclosure, raw water enters into the water inlet passage from the water inlet hole 11, and the raw water enters into the filter element casing 40 through the plurality of filter element casing water inlets in a spiral manner. Then it flows in a swirling and rotating manner on the surface of the filter element 20 so as to be filtered by the filter element 20 into filtered water and concentrated water; the filtered water enters into the water outlet passage through the filter element end cap 50 and flows out from the water outlet hole 12; and the concentrated water enters into the water outlet passage from the lower end of the filter element 20, and spirally flows out from the flushing hole 13.

Figure 1B:
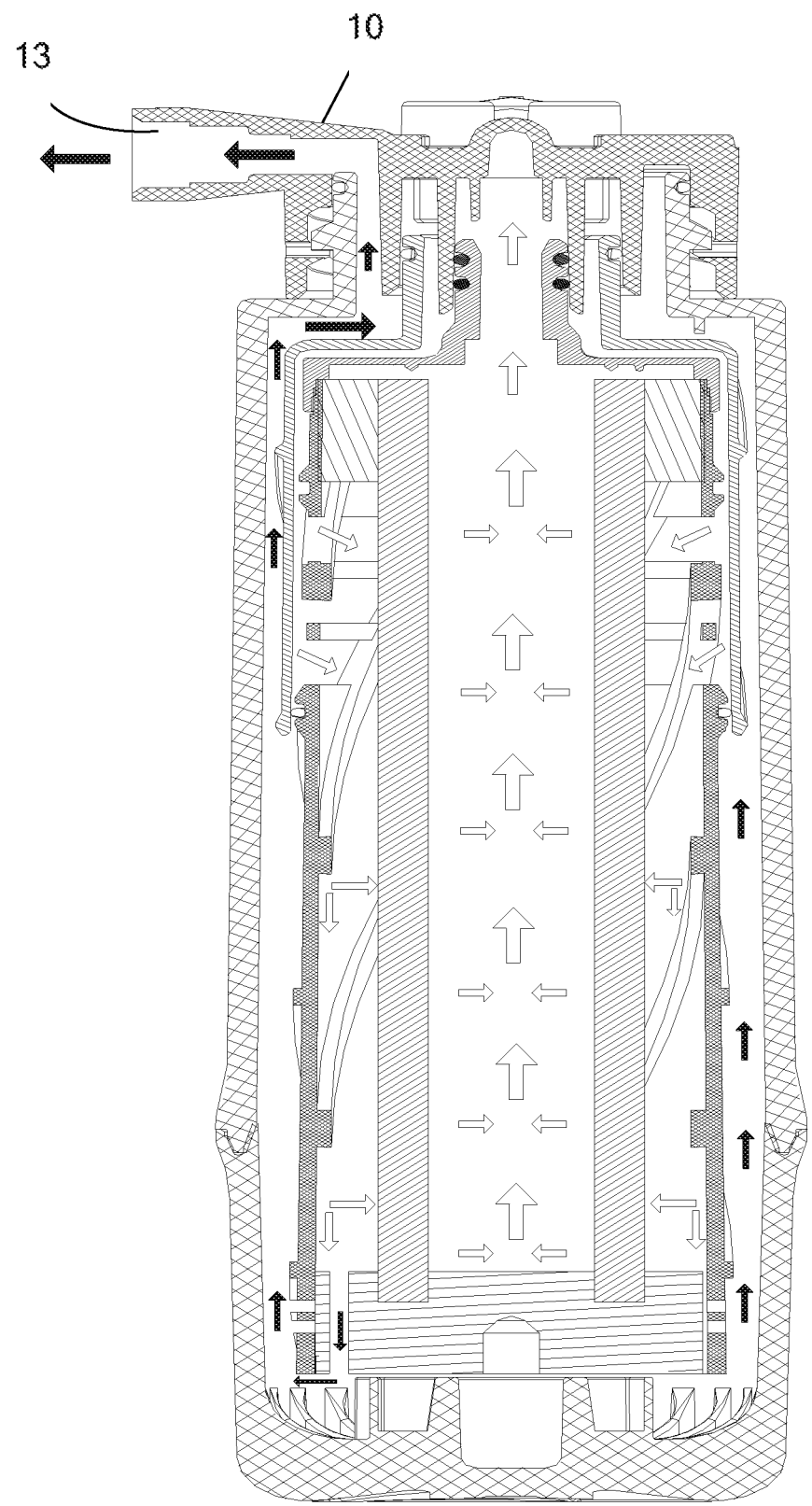
FIG. 1B is a sectional view of FIG. 1A axially rotated by 90 degrees clockwise.
Figure 1C:
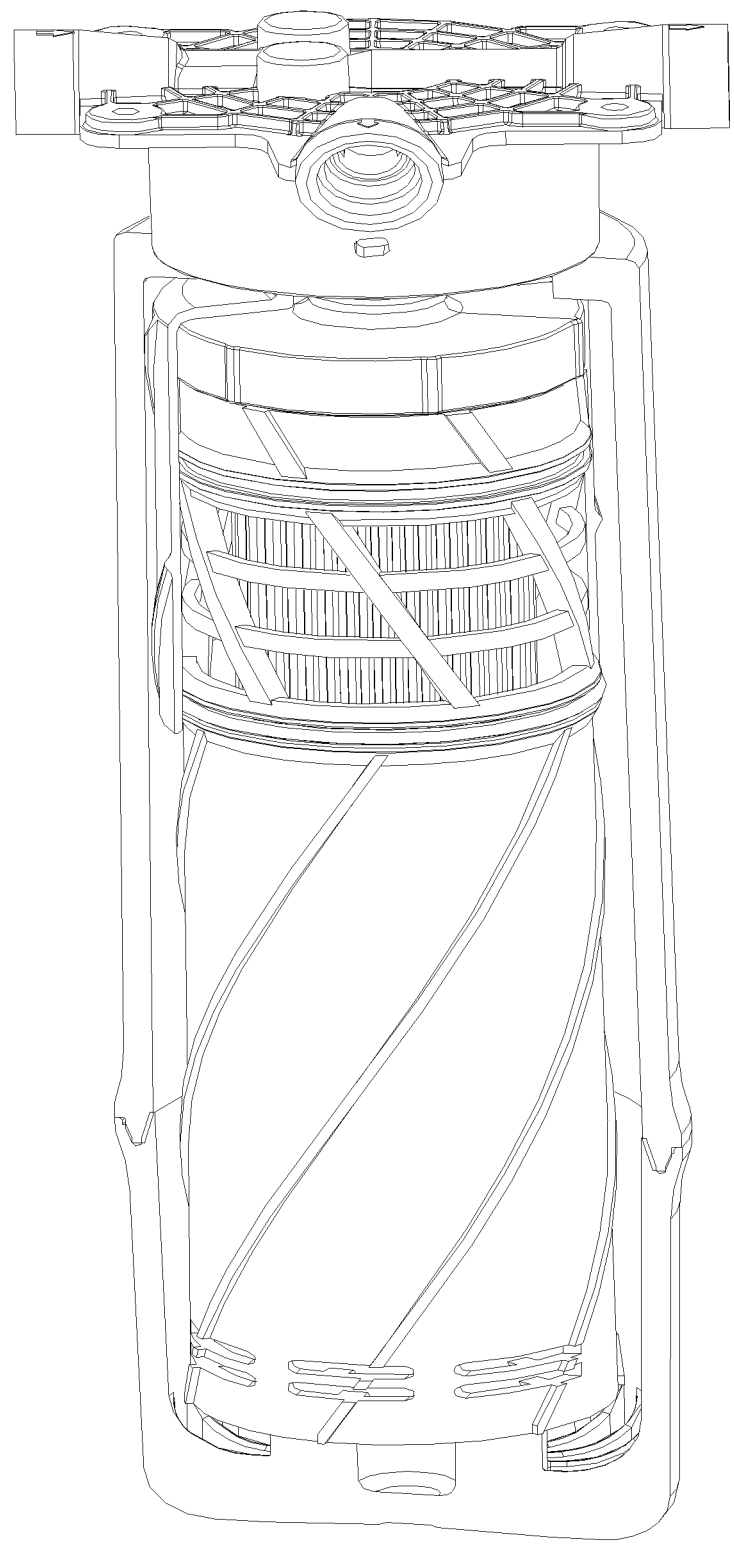
FIG. 1C is a stereoscopic view showing a part of an internal structure of the filter device.
Figure 2A:
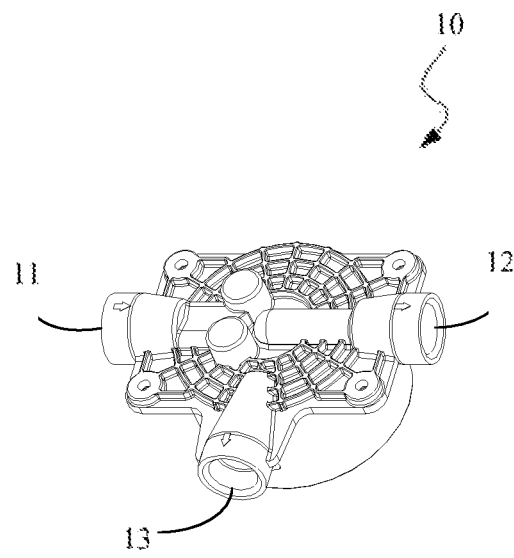
FIGS. 2A to 2C are a stereoscopic view, a bottom view and a top view of a head respectively.
Figure 2B:
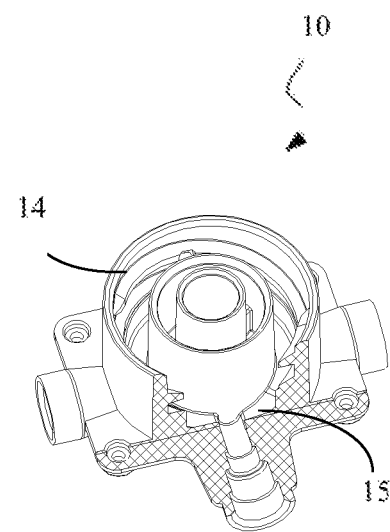
Figure 2C:
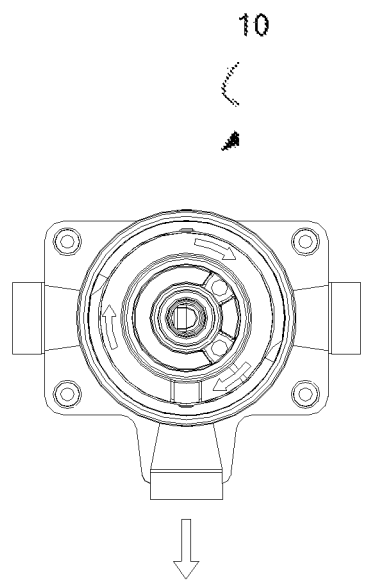

Hollow arrows in FIGS. 1A and 1B indicate a flow direction of raw water. The raw water enters the water inlet passage from the water inlet hole 11 and flows along the gap (the third gap) between the filter element end cap 50 and the flow divider 60; passing through the filter element end cap 50, the raw water continues flowing along the gap (the fourth gap) between the filter element casing 40 and the flow divider 60; and then the raw water spirally enters into the interior of the filter element casing 40 through the filter element casing water inlets of the filter element casing 40. After the raw water spirally enters into the interior of the filter element casing 40, the raw water forms a spirally rotating water flow to contact with the filter element 20 under the action of the flushing guide ribs 44. Therefore the raw water is capable of being filtered by the filter element 20 while it flushes the filter element 20.

Oblique-line arrows in FIGS. 1A and 1B indicate a flow direction of filtered water. The raw water flows swirly and rotationally on the surface of the filter element 20 and is filtered and divided by the filter element 20 into filtered water and concentrated water. The filtered water enters into the water outlet passage from the water outlet 53 of the filter element end cap 50 and flows out from the water outlet hole 12.

Black arrows in FIGS. 1A and 1B show a flow direction of concentrated water. The concentrated water enters the flushing passage from the lower end of the filter element 20, flows along a gap between the filter element casing 40 and the filter flask bottom cap 70. It continues flowing along a gap between the filter element casing 40 and the filter flask 30 (the gap between the filter element casing 40, and the filter flask bottom cap 70 as well as the filter flask 30 is defined as the first gap). Then the concentrated water flows along the gap (the second gap) between the flow divider 60 and the filter flask 30. The concentrated water finally enters into the head 10 and spirally flows out from the flushing hole 13 through a spiral water guiding surface 15. The spiral water guiding surface 15 is provided at the connection between the flushing passage and the flushing hole 13, and the concentrated water flows out from the flushing hole 13 through the spiral water guiding surface 15. The direction of an arrow in FIG. 2C indicates the direction from which the concentrated water spirally flows out.

The above Detailed Description includes references to the accompanying drawings, which form a part of the Detailed Description. The drawings show, by way of illustration, specific embodiments in which the present filter device with a spirally flushing function can be practiced. These embodiments are also referred to herein as "examples."

The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the present nut opener should be determined with reference to the appended claims, along with the full scope of equivalents to which such claims are entitled.

In the event of inconsistent usages between this document and any document incorporated by reference, the usage in this document controls.

In this document, the terms "a" or "an" are used to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, kit, or process that includes elements in addition to those listed after such a term in a claim are still deemed to fall within the scope of that claim. Moreover, in the following claims, any use of the terms "first," "second," and "third," etc. is not intended to impose numerical requirements on their objects, but is rather included for label purposes.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

It will be understood that various details of the presently disclosed subject matter may be changed without departing from the scope of the presently disclosed subject matter. Furthermore, the foregoing description is for the purpose of illustration only, and not for the purpose of limitation.

The invention claimed is:

1. A filter device with a spirally flushing function, comprising a head, a filter flask main body, a filter element, a filter element casing, a flow divider and a filter element end cap wherein the head comprises a water inlet hole, a water outlet hole, and a flushing hole, the water inlet hole being connected with a water inlet passage, the water outlet hole being connected with a water outlet passage, and the flushing hole being connected with a flushing passage;

the filter flask main body is connected with the head, and the filter element, the filter element casing, the flow divider and the filter element end cap are arranged inside the filter flask main body;

the filter element casing is arranged outside the filter element, and the filter element casing has a plurality of filter element casing water inlets, wherein a first gap, forming as a part of the flushing passage, is configurated between the filter element casing and the filter flask main body, wherein a plurality of spirally rotating flushing guide ribs is provided on an interior surface of the filter element casing and a plurality of spirally rotating flow guide ribs is provided at a lower portion of an outer surface of the filter element casing;

the flow divider is provided outside the filter element casing and covers a portion of an upper end of the filter element casing, wherein a second gap, forming as another part of the flushing passage, is configured between the flow divider and the filter flask main body;

the filter element end cap is fixed to the top of the filter element, and the filter element end cap provides a water outlet, which penetrates through the flow divider and is connected with the water outlet passage, wherein a third gap, forming as a part of the water inlet passage, is configured between the filter element end cap and the flow divider;

wherein raw water enters the water inlet passage from the water inlet hole, and enters into the filter element casing through the plurality of filter element casing water inlets and flows along the plurality of flushing guide ribs in a spiral manner, and then the raw water swirls and flows on the surface of the filter element and is divided by the filter element into filtered water and concentrated water; the filtered water enters into the water outlet passage from the filter element end cap and flows out from the water outlet hole; and the concentrated water enters into the flushing passage from a lower end of the filter element, and spirally flows along the plurality of flow guide ribs and out from the flushing hole.

2. The filter device according to claim 1, wherein the filter flask main body comprises a filter flask and a filter flask bottom cap; one end of the filter flask is connected with the head, and another end of said filter flask is connected with the filter flask bottom cap; the filter flask comprises a flask opening portion and a flask body portion; a filter flask thread is provided at the flask opening portion of the filter flask, and a head thread corresponding to the filter flask thread is provided on a side wall of the flushing passage of the head; and the head is connected with the filter flask by connecting the filter flask thread with the head thread.

3. The filter device according to claim 1, wherein a spiral water guiding surface is provided at a connection between the flushing passage and the flushing hole, and the concentrated water enters into the flushing passage from the lower end of the filter element, and swirls and flows out from the flushing hole through the spiral water guiding surface.

4. The filter device according to claim 1, wherein a plurality of spirally rotating water inlet guide ribs are provided on an upper portion of the outer surface of the filter element casing, and the plurality of filter element casing water inlets are provided at the water inlet guide ribs of the filter element casing; wherein a rotating direction of the plurality of flushing guide ribs is the same as that of the water inlet guide ribs and the plurality of flushing guide ribs is connected with the water inlet guide ribs; and wherein a rotating direction of the plurality of spirally rotating flow guide ribs is opposite to that of the water inlet guide ribs.

5. The filter device according to claim 4, wherein a seal groove of the filter element casing is further provided between the flow guide ribs and the water inlet guide ribs; a seal gasket of the filter element casing is arranged in the filter element casing seal groove; and the seal gasket of the filter element casing is configured to seal a gap between the filter element casing and the flow divider.

6. The filter device according to claim 4, wherein a plurality of spirally rotating diversion ribs are provided on an outer surface of the flow divider.

7. The filter device according to claim 4, wherein a seal groove is provided on the flow divider, in which a seal gasket of the flow divider is provided, and the seal gasket of the flow divider is configured to seal a gap between the flow divider and a side wall of the water inlet.

8. The filter device according to claim 1, wherein a protruding portion is provided at the filter element end cap, and the water outlet is provided at a middle position of the protruding portion of the filter element end cap.

9. A filter device with a spirally flushing function, comprising a head, a filter flask main body, a filter element, a filter element casing, a flow divider and a filter element end cap, wherein the head comprises a water inlet hole, a water outlet hole and a flushing hole;

the filter flask main body is connected with the head, and the filter element, the filter element casing, the flow divider and the filter element end cap are arranged inside the filter flask main body;

the filter element casing is arranged outside the filter element, and the filter element casing has a plurality of filter element casing water inlets, wherein a first gap, forming as a part of a flushing passage which is connected with the flushing hole, is configured between the filter element casing and the filter flask main body, wherein a plurality of spirally rotating flushing guide ribs is provided on an interior surface of the filter element casing and a plurality of spirally rotating flow guide ribs is provided at a lower portion of an outer surface of the filter element casing;

the flow divider is provided outside the filter element casing and covers a portion of an upper end of the filter element casing, wherein a second gap, forming as another part of the flushing passage, is configured between the flow divider and the filter flask main body;

the filter element end cap is fixed to a top of the filter element, and the filter element end cap provides a water outlet, which penetrates through the flow divider and is connected with a water outlet passage, wherein a third gap, forming as a part of the water inlet passage, is configured between the filter element end cap and the flow divider; and wherein a fourth gap, forming as another part of the water inlet passage, is configured between the filter element casing and the flow divider;

wherein raw water enters into the water inlet passage from the water inlet hole and swirls and flows along the plurality of flushing guide ribs in a rotating manner on the surface of the filter element through the water inlet passage so as to be divided by the filter element into filtered water and concentrated water; the filtered water enters into the water outlet passage from the water outlet of the filter element end cap and flows out from the water outlet hole; and the concentrated water enters into the flushing passage from a lower end of the filter element, and spirally flows along the plurality of flow guide ribs and out from the flushing hole.

10. The filter device according to claim 9, wherein the filter flask main body comprises a filter flask and a filter flask bottom cap; one end of the filter flask is connected with the head, and another end of said filter flask is connected with the filter flask bottom cap; the filter flask comprises a flask opening portion and a flask body portion; a filter flask thread is provided at the flask opening portion of the filter flask, and a head thread corresponding to the filter flask thread is provided on a side wall of the flushing passage of the head; and the head is connected with the filter flask by connecting the filter flask thread with the head thread.

11. The filter device according to claim 9, wherein a spiral water guiding surface is provided at the connection between the flushing passage and the flushing hole, and the concentrated water enters into the flushing passage from the lower end of the filter element, and swirls and flows out from the flushing hole through the spiral water guiding surface.

12. The filter device according to claim 9, wherein a plurality of spirally rotating water inlet guide ribs are provided on an upper portion of the outer surface of the filter element casing, and the plurality of filter element casing water inlets are provided at the water inlet guide ribs of the filter element casing; wherein a rotating direction of the plurality of flushing guide ribs is the same as that of the water inlet guide ribs and the plurality of flushing guide ribs is connected with the water inlet guide ribs; and wherein a rotating direction of the plurality of spirally rotating flow guide ribs is opposite to that of the water inlet guide ribs.

13. The filter device according to claim 12, wherein a seal groove of the filter element casing is further provided between the flow guide ribs and the water inlet guide ribs; a seal gasket of the filter element casing is arranged in the filter element casing seal groove; and the seal gasket of the filter element casing is configured to seal a gap between the filter element casing and the flow divider.

14. The filter device according to claim 12, wherein a plurality of spirally rotating diversion ribs are provided on an outer surface of the flow divider.

15. The filter device according to claim 12, wherein a seal groove is provided on the flow divider, in which a seal gasket of the flow divider is provided, and the seal gasket of the flow divider is configured to seal a gap between the flow divider and a side wall of the water inlet.

16. The filter device according to claim 9, wherein a protruding portion is provided at the filter element end cap, and the water outlet is provided at a middle position of the protruding portion of the filter element end cap.

* * * * *